United States Patent [19]

Bauman et al.

[11] Patent Number: 4,599,367

[45] Date of Patent: Jul. 8, 1986

[54] WATER-BLOWN SILICONE FOAM

[75] Inventors: Therese M. Bauman, Midland; John E. Dietlein, Bay City, both of Mich.

[73] Assignee: Dow Corning Corporation, Midland, Mich.

[21] Appl. No.: 787,854

[22] Filed: Oct. 16, 1985

[51] Int. Cl.[4] .............................. C08J 9/14; C08J 9/30
[52] U.S. Cl. ........................................ 521/71; 521/65; 521/86; 521/98; 521/134; 521/154; 521/110; 521/111; 528/15; 528/31; 528/32
[58] Field of Search ............... 528/15, 31, 32; 521/65, 521/71, 86, 134, 154

[56] References Cited

U.S. PATENT DOCUMENTS

| | | | |
|---|---|---|---|
| 3,070,555 | 12/1962 | Bruner | 521/127 |
| 3,425,967 | 2/1969 | Modic | 521/119 |
| 3,428,580 | 2/1969 | Nitzche et al. | 521/124 |
| 3,923,705 | 12/1975 | Smith | 521/154 |
| 4,026,843 | 5/1977 | Kittle | 521/88 |
| 4,026,845 | 5/1977 | Kim et al. | 521/154 |
| 4,189,545 | 2/1980 | Modic | 521/154 |

FOREIGN PATENT DOCUMENTS 2065661 7/1981 United Kingdom .

*Primary Examiner*—Morton Foelak
*Attorney, Agent, or Firm*—Edward C. Elliott

[57] ABSTRACT

This invention relates to a method of producing silicone elastomeric foam of low density. The method mixes polydiorganosiloxanes having hydroxyl endblocking or vinyl endblocking or mixtures of both along with water to react with silicon hydride in the presence of platinum catalyst to release hydrogen gas to create a froth which cures to a foam. The combination of ingredients allows the manufacture of silicone foam having different combinations of properties than those obtained from previous methods. Embodiments of the invention also make use of specific profoamers and specific alcohols to further modify the properties of the foams produced. The method of this invention yields a low cost, low density, silicone elastomeric foam having physical properties which enable it to be used in cushioning and sealing applications.

13 Claims, No Drawings

WATER-BLOWN SILICONE FOAM

BACKGROUND OF THE INVENTION

1. Field of the Invention

This invention relates to silicone foam containing water as one of the agents used to create the foam.

2. Background Information

Over the years, the use of elastomeric foams of various types have become the standard for cushioning materials, both for seats and for packaging and for gasketing. Various uses require a variety of properties of the foams depending upon how they are used. Some cushioning applications require a very soft, open-cell foam which is easily compressed while other applications require a firm, closed-cell foam which is density, flammability, and toxicity become important in some uses. Because of the wide variety of combinations required, many different methods of producing various types of foam have been developed.

A method of making an organosiloxane foam is described by Smith in U.S. Pat. No. 3,923,705, issued Dec. 2, 1975. His method mixes an organohydrogensiloxane, a hydroxylated organosiloxane, and a platinum catalyst, where the molar ratio of silicon-bonded hydrogen atoms to silicon-bonded hydroxyl radicals of 2.5 to 40 is specified. He also describes the use of polymethylvinylsiloxane cyclics to retard foaming and curing reactions, the addition of carbon black, and the use of vinyl-containing polydiorganosiloxane up to 85 weight percent of the combined weight of hydroxylated polydiorganosiloxane and vinyl-containing polydiorganosiloxane. In the later instance, the molar ratio of silicon-bonded hydrogen atoms to silicon-bonded hydroxyl radicals is 0.5 to 40.

A foam composition useful as insulation for electrical systems which does not burn easily is taught by Modic in U.S. Pat. No. 4,189,545, issued Feb. 19, 1980. The novel foaming agent is water. His foam composition comprises a base vinyl-containing polydiorganosiloxane, from 100 to 15,000 parts per million of water, a silicone hydride having a hydrogen content of from 0.3 to 1.6 percent by weight where there is at least 0.2 moles of SiH per mole of water, and platinum catalyst.

Another composition is taught by Modic in British Specification No. 2,065,661 A, published July 1, 1981. In this case, he points out that the composition containing water separates upon standing and must be remixed before it can be used. The composition of this British application therefore comprises a base vinyl-containing polymer, from 1 to 10 parts by weight of silanol-containing compound having a viscosity of from 10 to 1,000 centipoise at 25° C., a silicone hydride where there is at least 1 mole of SiH per mole of silanol, and a platinum catalyst.

Compositions such as these produce silicone foam which has fire retardant properties, but there is still a need for silicone foam of improved compressibility and lower density while still retaining useful strength. Such foams still retain the superior weatherability, lower toxicity, and longer life of silicone based foam as compared to organic foams such as urethane based foam.

SUMMARY OF THE INVENTION

This invention relates to a method of producing silicone elastomeric foam which can be made with hydroxyl radical endblocked or vinyl radical endblocked polydiorganosiloxanes or mixtures of them. The method produces hydrogen, to create a froth which cures to a foam, by use of water to react with a silicon hydride in the presence of a platinum catalyst. The combination of hydroxyl radical endblocked polydiorganosiloxane, vinyl endblocked polydiorganosiloxane, and water, all of which react with silicone hydride in the presence of a platinum catalyst allows the manufacture of silicone foam having different combinations of physical properties than those obtained from previous methods which do not use these combinations of ingredients.

It is an object of this invention to produce low cost silicone foam which has a relatively low density.

DESCRIPTION OF THE INVENTION

This invention relates to a method of producing an open-cell silicone foam at room temperature consisting of (A) mixing ingredients consisting essentially of (1) 100 parts by weight of a polydiorganosiloxane having organic groups selected from the group consisting of methyl, ethyl, propyl, vinyl, phenyl, and 3,3,3-trifluoropropyl, endblocking consisting of hydroxyl or vinyl groups, and a viscosity of from 0.4 to 100 Pa·s at 25° C., (2) from 15 to 50 parts by weight of a silicon hydride of the formula

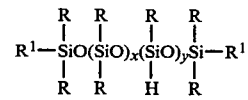

where R is an alkyl radical of 1 to 4 carbon atoms or phenyl and $R^1$ is R or hydrogen, x and y are such that x is from 0 to 40 percent of y, y is at least 3, and x plus y are such that the viscosity of the silicon hydride is below 0.05 Pa·s at 25° C., (3) from 0.5 to 15 parts by weight of water, (4) from 10 to 100 parts by weight of platinum per million parts of (A) in the form of a platinum catalyst, (5) optionally a profoamer consisting essentially of a resinous, benzene-soluble organosiloxane copolymer consisting essentially of $SiO_{4/2}$ units, silicon-bonded hydroxyl groups, $(CH_3)_3SiO_{\frac{1}{2}}$ units and fluorine-containing units selected from the group consisting of $R_aR_b'SiO_{(4-a-b)/2}$ and $R''[Si(R')_bO_{(3-b)/2}]_2$ and mixtures thereof, where R is a monovalent organic radical containing at least four perfluorinated carbon atoms and is bonded to the silicon atom of said fluorine-containing units by a sequence of at least two methylene units or by an oxygen atom that is, in turn, bonded to a sequence of at least two methylene units, R' is an alkyl radical containing from 1 to 3 carbon atoms, and R" is a divalent organic radical containing at least four perfluorinated carbon atoms and is bonded to the silicon atom of said fluorine-containing units by means of a carbon or oxygen atom, a is 1 or 2, b is 0, 1 or 2 and the sum of a and b is 3 or less with the provision that when R and R" represent fluorine-containing units bonded to silicon via an oxygen atom the organosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and $SiO_{4/2}$ units to $SiO_{4/2}$ units is from 0.7:1 to 1.1:1, inclusive, and the concentration of said fluorine-containing units and any $GSiO_{3/2}$ units is sufficient to (a) impart a surface tension of less than $2.2 \times 10^{-4}$ newtons per centimeter at 25° C. to a 10 percent by weight solution of (5) in a hydroxyl endblocked polydimethylsiloxane exhibiting a viscosity of 0.08 Pa·s at 25° C., and (b) require the addition of from 0 to 100 percent by weight of xylene to said 10 percent by weight solution to achieve optical clarity, and (6) optionally an alcohol having from 1 to 12 carbon atoms, and (B) allowing the mixture to form a froth and cure at ambient temperature to an elastomeric silicone foam.

The method of this invention produces a froth upon mixing of the ingredients because the ingredients react upon mixing to form hydrogen gas. As the amount of water used is increased, more hydrogen gas is produced, the density of the foam is lowered, and the proportion of cells being open cells, rather than closed cells, increases. The ingredients are preferably combined into two parts for storage purposes. The platinum catalyst (4) is in one part with all or part of the polydiorganosiloxane (1) while the silicon hydride (2) is in the other part. The polydiorganosiloxane is preferably divided between the two parts. If both a hydroxyl endblocked polydiorganosiloxane and a vinyl endblocked polydiorganosiloxane are used, it is convenient to have one of the polydiorganosiloxanes in one part and the other polydiorganosiloxane in the other part. For convenience in mixing, it is preferred that the consistency of each part be about the same and that the amount of each part be some convenient ratio such as a 1 to 1 mix or a 2 to 1 mix.

Foam can be produced in a continuous manner by use of continuous mixing devices which continuously meter each ingredient or mixtures of ingredients into a mixing chamber in the proper ratio, continuously mix, and continuously discharge the mixture into a container or onto a belt where the mixture forms a froth and cures into a foam.

A preferred two-part system combines the ingredients into two parts for storage purposes, then combines the two parts at the time the foam is desired. Preferred are two parts where a hydroxyl endblocked polydiorganosiloxane, and a vinyl endblocked polydiorganosiloxane are combined with the platinum catalyst in one part and a hydroxyl endblocked polydiorganosiloxane, silicone hydride, and the water are combined in the other part. The two parts can be easily stored because there is little reaction between the ingredients. When the two parts are mixed together, the reaction of the silicon hydride with the hydroxyl endblocked polydiorganosiloxane yields both hydrogen gas and crosslinks, reaction with the vinyl endblocked polydiorganosiloxane yields crosslinks, and reaction with the water yields hydrogen and polymerization of the silicon hydride. All of these reactions take place at room temperature only in the presence of the platinum catalyst.

It is possible to make foams using only hydroxyl endblocked polydiorganosiloxane or only vinyl endblocked polydiorganosiloxane, but it is preferred to have both a hydroxyl on silicon and a vinyl on silicon because the amount of each reactive group can be adjusted to give the amount of hydrogen gas and the amount of crosslinking desired in the final foam. The amount of water also regulates the amount of hydrogen gas produced. In general, more hydrogen gives a less dense foam with more open cells, while more crosslinking gives a harder foam.

One embodiment of the method of this invention adds a profoamer, of a particular class as described herein, to the composition. The profoamer allows the production of a foam having smaller, more uniform cells than when the profoamer is not present. When the profoamer is present, it is possible to use a higher proportion of the water or the optional alcohol or both to produce higher amounts of hydrogen gas to get a lower density and still maintain a good cell structure. When very low density foams are attempted by increasing the hydrogen generation in formulations without the profoamer, the cells tend to become larger and more irregular with a poorer foam structure resulting.

Another embodiment of the method of this invention adds an alcohol as an ingredient. Adding alcohol produces a foam having a lower density and a lower Bashore resiliency than when the alcohol is not present. The combination of profoamer and alcohol added to the composition produces the lowest Bashore resiliency.

The hydroxyl endblocked polydiorganosiloxane of (1) is well-known in the art. Preferred are polydiorganosiloxanes of the formula

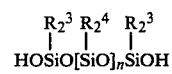

where $R^3$ and $R^4$ are selected from the group consisting of methyl, ethyl, propyl, vinyl, phenyl, and 3,3,3,-trifluoropropyl where at least 50 percent of $R^4$ is methyl and n is such that the viscosity is from 0.4 to 100 Pa.s at 25° C., preferably from 1 to 50 Pa·s. The hydroxyl endblocked polydiorganosiloxane can be homopolymers, copolymers, or mixtures thereof. They can be mixtures of different molecular weight species and varying hydroxyl content.

The vinyl-containing polydiorganosiloxane of (1) is well-known in the art. Preferred are vinyl endblocked polydiorganosiloxanes of the formula

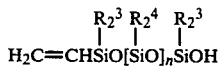

where $R^3$ and $R^4$ are as defined above and n is such that the viscosity is from 0.4 to 100 Pa·s at 25° C., preferably from 0.4 to 50 Pa·s.

The silicone hydride (2) of the formula

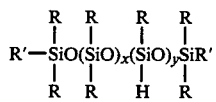

where R is an allyl radical of 1 to 4 carbon atoms or phenyl and R' is R or hydrogen, x and y are such that x is from 0 to 40 percent of y, y is at least 3 and x plus y are such that the viscosity of the silicon hydride is below 0.05 Pa·s at 25° C. are well-known in the art. The silicon hydride can be homopolymer, copolymer, and mixtures thereof. Preferably the silicon hydride is a copolymer of trimethylsiloxy and methylhydrogensiloxane or a copolymer of trimethylsiloxy, methylhydrogensiloxane, and dimethylsiloxane. Preferably, the silicon hydride has an average of at least 5 silicon bonded hydrogen atoms per molecule. Preferably, x is less than 5 percent of y.

The platinum catalyst (4) can be any of the well-known forms used for catalyzing the reaction of allyl groups on silicon or hydroxyl groups on silicon with hydrogen atoms on silicon. A preferred form of platinum is a chloroplatinic acid catalyst complex as prepared by the method described in U.S. Pat. No. 3,419,593, issued Dec. 31, 1968, which is hereby incorporated by reference, where chloroplatinic acid is mixed with symmetrical divinyltetramethyldisiloxane to provide the complex.

The optional profoamer (5) is a resinous, benzenesoluble organosiloxane copolymers wherein the repeating units include, but are not limited to, $SiO_{4/2}$ units, $(CH_3)_3SiO_{\frac{1}{2}}$ units and fluorine-containing units comprising at least four perfluorinated carbon atoms and represented by R and R" in the formulae $R_aR_b'SiO_{(4-a-b)/2}$ and $R''[Si(R')_bO_{(3-b)/2}]_2$. Each of the fluorine-containing units also includes one or two silicon atoms that are joined to the fluorine-containing carbon atoms by a sequence of at least two methylene ($-CH_2-$) units or by an oxygen atom that is, in turn, bonded to said sequence. This sequence forms part of the group represented by R in the foregoing formulae.

The fluorine-containing units of (5) can be identical or different. These units exhibit the general average formula $R_aR_b'SiO_{(4-a-b)/2}$ or $R''[Si(R')_bO_{(3-b)/2}]_2$. In these formulae R and R" represent, respectively, monovalent and divalent fluorinated organic radicals as described hereinbefore, R' is alkyl containing from 1 to 3 carbon atoms, a is 1 or 2, b is 0, 1 or 2 and the sum of a and b is 3 or less.

In addition to at least four perfluorinated carbon atoms, R and R" can include partially fluorinated and/or nonfluorinated carbon atoms. The carbon atoms of R and R" can be present in the form of linear chains, branched chains or carboxylic rings. The fluorinated carbon atoms comprising R and R" can be adjacent or separated by nonfluorinated carbon atoms, by atoms such as nitrogen, oxygen or sulfur or by divalent groups such as carbonyl, amido, carboalkoxy, and other groups which do not hydrolyze readily, will not cause premature curing of the present foamable compositions during storage and will not substantially inhibit curing of the compositions in the presence of atmospheric moisture. R and R" can contain from 4 to 20 or more carbon atoms, but preferably contain from 4 to 16 carbon atoms.

The relative concentrations of $(CH_3)_3SiO_{\frac{1}{2}}$, fluorinated siloxane units and any additional units other than $SiO_{4/2}$ units and hydroxyl groups must be within certain limits for (5) to function effectively. These limits are most conveniently expressed in terms of their effect on the surface tension of a hydroxyl terminated polydimethylsiloxane and on the solubility of (5) in this medium.

Specifically, a 10% by weight solution of (B) in a hydroxyl-terminated polydimethylsiloxane exhibiting a viscosity of 0.08 Pa.s at 25° C. should exhibit a surface tension of less than $2.2 \times 10^{-4}$ newtons per centimeter at 25° C. Furthermore, at this same concentration level and temperature the solution must be either optically clear or become optically clear following the addition of not more than 100%, based on the weight of said solution, of xylene.

While not wishing to be bound by any theory, it appears that effective profoamers decrease the surface tension of a foamable composition and exhibit only limited solubility in the composition. The low degree of solubility ensures that at least a portion of the profoamer will be present at liquid-gas interfaces of the cellular structure of the froth formed by the formation of hydrogen gas, thereby reducing the surface tension at the liquid-gas interfaces and increasing the stability of the froth during the curing reaction. The relatively high viscosity of the present profoamers is believed to impart additional stability to the froth during curing by increasing the elasticity of the cell walls and also reducing the rate at which liquid drains from the cellular structure.

The molar ratio of units other than silicon-bonded hydroxyl groups in (5) and $SiO_{4/2}$ units to $SiO_{4/2}$ units is from 0.7:1 to 1.1:1, inclusive. To maximize the efficacy of (5) as a foam stabilizer for the preferred foamable compositions disclosed in the accompanying examples, this ratio is preferably from 0.7:1 to 0.9:1, inclusive.

In addition to the silicon-containing units disclosed hereinbefore, (5) typically contains from 0.2 up to about 4% by weight of silicon-bonded hydroxyl groups. (5) can also contain up to about 10 weight % of $GSiO_{3/2}$ units, where G represents the residue obtained by removing the hydrogen atom from a hydroxyl group of a hydroxyl containing linear organic polymer. Useful organic polymers include homopolymers of ethylenically unsaturated alcohols such as allyl and cinnamyl alcohol, copolymers of these alcohols with ethylenically unsaturated hydrocarbons such as styrene, and polyethers or polyoxyalkylene glycols containing an average of at least one terminal hydroxyl group per molecule. Preferred polymers include styrene/allyl alcohol copolymers and polyoxyalkylene glycols such as polyoxyethylene glycol.

While not a required part of (5), the presence of GSiO$_{3/2}$ units is desirable because they permit (5) to function as an effective stabilizer with less fluorine than would be required if the GSiO$_{3/2}$ units were absent. Because in many instances hydroxyl-containing organic polymers corresponding to the formula GH are considerably less expensive than the fluorine-containing intermediates used to prepare (5), it is usually preferable to employ these organic polymers in place of the additional fluorine-containing intermediate needed to decrease the solubility of (5) in the mixture of (A).

Resinous copolymers wherein fluorine-containing hydrocarbon radicals are bonded to silicon through at least two methylene units can be prepared by reacting trimethylchlorosilane in combination with (1) a fluorine-containing silane of the formula R$_a$R$_b$'SiCl where the sum of a and b is 3, (2) a silane of the formula R"[Si(R)$_2$Cl]$_2$, or (3) suitable derivatives of either (1) or (2) wherein the chlorine atoms are replaced by other hydrolyzable groups. The resultant fluorinated silane is reacted with an aqueous solution of sodium silicate as described by Daudt et al. in U.S. Pat. No. 2,676,182, which issued on Apr. 20, 1954. The disclosure of this patent is incorporated herein in its entirety by reference. The reaction of fluorine-containing silanes with sodium silicate is disclosed in U.S. Pat. No. 3,328,349, which issued on June 27, 1967 to Lentz and is incorporated herein in its entirety by reference. In accordance with a combination of Lentz's and Daudt et al.'s teaching, an aqueous solution of sodium silicate (e.g. No. 9 sodium silicate sold by E. I. Dupont de Nemours and Co.) is acidified to the proper pH by adding it to a mixture of hydrochloric acid and isopropanol. The resulting acidic silica hydrosol can then be treated with a source of R$_a$R$_b$'SiO$_{(4-a-b)/2}$ siloxane units, such as (R)(CH$_3$)$_2$SiOCH$_3$ or (R)(CH$_3$)$_2$SiCl, and a source of (CH$_3$)$_3$SiO$_{\frac{1}{2}}$ units, such as (CH$_3$)$_3$SiCl. These reactants are preferably first dissolved in a mixture of isopropanol and xylene. If chlorosilanes are used, acidification of the sodium silicate may not be required.

After being heated for the time interval required to substantially complete the reaction, the resultant mixture is cooled, whereupon it separates into an aqueous phase, which is discarded, and a nonaqueous phase containing the resinous copolymer. The nonaqueous phase is washed with water to reduce its acid number and remove water-soluble components, such as isopropyl alcohol. Preferably the resinous copolymers prepared by this method are washed with water to remove most, but not all of the acid. The products typically have sufficient acid to provide an acid number of from 0.2 to 2.0.

The fluorinated silanes and siloxanes that can be used to prepare (5) are either known or can be synthesized using known methods.

If organic solvents are used to prepare the foam stabilizer (5), these are preferably replaced with a trimethylsiloxy endblocked polydimethylsiloxane exhibiting a viscosity of from about 0.001 to about 1 Pa.s at 25° C.

If it is desired to incorporate repeating units of the foregoing GSiO$_{3/2}$ type into the copolymer, this can be accomplished by including the corresponding hydroxyl-containing polymer GH in the reaction mixture together with the fluorinated reactant. Suitable polymers have been discussed hereinbefore.

A second method for preparing profoamers containing either SiO or SiC bonds comprises reacting non-fluorinated resinous copolymers of the type described in the aforementioned Daudt et al. patent with a fluorinated material. Suitable copolymers contain (CH$_3$)$_3$SiO$_{\frac{1}{2}}$ and SiO$_{4/2}$ units in addition to from 0.5 to 4.0% by weight of silicon-bonded hydroxyl groups. The copolymers are reacted with at least one fluorine-containing silane of the formula R$_a$R$_b$'SiY$_{(4-a-b)}$ or YSi(R')$_2$R"(R')$_2$SiY, a partial hydrolysis product of either of the foregoing silanes or at least one fluorine-containing alcohol of the formula F(C$_n$F$_{2n}$)(CH$_2$)$_2$OH where R, R', R", a and b are defined hereinbefore, Y is a halogen, preferably chlorine or other hydrolyzable group and the average value of n is from 4 to 20.

In preferred embodiments of (5), R of the foregoing formula represents F(C$_n$F$_{2n}$)(CH$_2$)$_2$O$_c$, R' is methyl, R" represents —O$_c$(CH$_2$)$_2$(C$_n$F$_{2n}$)(CH$_2$)$_2$O$_c$—, c is 0 or 1, and the average value of n is at least 4. Most preferably R represents a mixture of homologous units wherein n is an even integer from 4 to 14 inclusive.

The silanes employed to prepare preferred embodiments of (5) wherein c of the foregoing formulae is 0 exhibit the formulae F(C$_n$F$_{2n}$)CH$_2$CH$_2$Si(CH$_3$)$_d$Y$_{3-d}$ or Y$_{3-d}$(CH$_3$)$_d$SiCH$_2$CH$_2$2(C$_n$F$_{2n}$)CH$_2$CH$_2$Si(CH$_3$)$_d$Y$_{3-d}$ where d is 0, 1 or 2 and n is as defined hereinbefore. These silanes can be prepared by hydrosilation of a fluorinated olefin of the formula F(C$_n$F$_{2n}$) CH=CH$_2$ or CH$_2$=CH(C$_n$F$_{2n}$)CH=CH$_2$ with a silane of the formula (CH$_3$)$_d$Y$_{3-d}$SiH. The fluorinated olefin can be a single compound or a mixture of homologs wherein n is an even integer having a value of from 4 to 14, inclusive. The hydrosilation reaction is typically carried out at temperatures of from 150° to 300° C. using as the catalyst an organic peroxide or a platinum-containing material such as chloroplatinic acid. The hydrosilation of fluorinated olefins is disclosed, for example, in U.S. Pat. No. 3,620,992, which issued to Kim and Pierce on Nov. 16, 1971 and is incorporated herein in its entirety by reference.

The preferred profoamers wherein c is 1 and a method for preparing these stabilizers are claimed in an application for Letters Patent entitled "Polyorganosiloxane Compositions", Ser. No. 664,898, filed Oct. 26, 1984, by Joseph Woodward Keil, which is herein incorporated by reference to show such profoamers and their method of manufacture.

Preferred profoamers of the foregoing formula where c is 0 are claimed in an application for Letters Patent entitled "Novel Fluorinated Organosiloxane Copolymers", Ser. No. 664,897, filed Oct. 26, 1984, by Chi-Long Lee, Thomas Fay-Oy Lim and Anthony Pope Wright which is herein incorporated by reference to show such stabilizers. A method for preparing these profoamers is claimed in an application for Letters Patent entitled "Method for Preparing Novel Fluorinated Organosiloxane Copolymers", Ser. No. 664,917, filed Oct. 26, 1984, by Thomas Fay-Oy Lim and Antony Pope Wright which is herein incorporated by reference to show such method.

One embodiment of the method of this invention adds an alcohol having from 1 to 12 carbon atoms to the composition used. The alcohol can also react with the hydrogen atoms on silicon in the presence of the platinum catalyst to generate additional hydrogen gas. When a monohydroxyl alcohol is used, there is no corresponding crosslink formed, so the resulting foam tends to have fewer crosslinks than if the alcohol was not present. Foams containing alcohol tend to have lower density than when it is not present. Preferred alcohols are normal propanol and lauryl alcohol.

Additional ingredients can be added to the mixture of (A) to further modify the foam produced. A platinum catalyst inhibitor, such as methylvinylcyclosiloxane, can be used to slow the reaction rate so that mixing can be completed before the mixture starts to form a froth. Fillers can also be added to the mixtures such as fume silica, diatomacious earth, crushed quartz, zinc oxide, calcium carbonate, fibrous potassium titanate, or other well-known fillers for silicone elastomers. The maximum amount of filler used will depend upon the viscosity of the mixture of (A). The fire retardant properties of the foam can be increased by adding to the ingredients from 0.01 to 10 percent by weight of carbon black, preferably from 0.05 to 5 percent by weight. The carbon black should be free of sulfur so that it does not interfere with the function of the platinum catalyst. The toughness of the foam can be increased by adding fibers to the composition. If the fibers are carbonaceous or ceramic in nature, the flame resistance of the foam can also be improved.

Useful foams are produced by mixing the ingredients within the limits of 15 to 50 parts by weight of silicon hydride (2), 0.5 to 15 parts by weight of water (3) based upon 100 parts by weight of polydiorganosiloxane (1), and 10 to 100 parts by weight of platinum per million parts of (A). The 100 parts by weight of polydiorganosiloxane can consist of all hydroxyl endblocked polydiorganosiloxane or all vinyl endblocked polydiorganosiloxane or any ratio of one to the other. The silicon hydride is preferably from 15 to 30 parts by weight, based upon 100 parts by weight of (1). The amount of silicon hydride is preferably such that an excess of hydrogen atom on silicon is present to react with the hydroxyl radicals, vinyl radicals, water, and alcohol present in the composition. Preferably, there is from 3 to 10 times as much hydrogen atom on silicon present as is required to react with the other ingredients to insure that all the reactions can be carried out to completion and a stable product results. The water is preferably present in an amount of from 1 to 5 parts by weight based upon 100 parts by weight of (1). The preferred amount of profoamer (5) is from 1 to 10 parts by weight based upon 100 parts of (1). The preferred amount of alcohol is from 1 to 5 parts by weight, based upon 100 parts of (1).

The foams of this invention can be used for cushioning, insulation sealing, sound absorbing and the like. They can be made fire retardant so that they are useful in applications which benefit from having foam which retards the spread of fire.

The following examples are included for illustrative purposes only and should not be construed as limiting the invention which is properly set forth in the appended claims.

All parts are parts by weight.

EXAMPLE 1

A two-part composition was prepared which yielded a foam upon mixing of the two parts.

Part A was prepared by mixing 104.8 g of a hydroxyl endblocked polydimethylsiloxane having an approximate number average molecular weight of about 40,000 with a minor amount of cyclic polydimethylsiloxane present as an impurity, the combination having a viscosity of about 13.5 Pa·s at 25° C., 94 g of a dimethylvinylsiloxy endblocked polydimethylsiloxane having a viscosity of about 30 Pa·s at 25° C., and 1.2 g of a chloroplatinic acid complex of divinyltetramethyldisiloxane diluted with dimethylvinylsiloxy endblocked polydimethylsiloxane to provide 0.7 weight percent platinum.

Part B was prepared by mixing 96.9 g of the above hydroxyl endblocked polydimethylsiloxane, 61.1 g of trimethylsiloxy endblocked polymethylhydrogensiloxane with a viscosity of about 0.03 Pa·s at 25° C. and a hydrogen atom content of about 1.6 weight percent, 3 g of water, and 0.4 g of cyclic methylvinylsiloxane.

A foam was produced by rapidly mixing part A and part B in a container and allowing a foam to form. The foam formed very fast. It had a good cell structure with a density of about 252 kg/m$^3$.

A comparative example was prepared by repeating the above composition, but removing the water from Part B.

A foam was produced by rapidly mixing Part A and Part B in a container and allowing a foam to form. The foam formed rapidly, having a crosslinked structure in one minute after mixing. The foam was predominantly closed cell, with even cell distribution and size, and with a density of about 385 kg/m$^3$.

The comparative foam, without the water present, had a density about 50 percent greater than the foam falling under this invention. Within 24 hours of foam formation, the foam developed enough internal stress to cause it to tear itself apart.

EXAMPLE 2

Foam samples were prepared similar to those in Example 1 but changing the amount of water used. Table I lists the grams of water used, the density of the foam produced, and comments upon the foam.

TABLE I

| Water gms | Density kg/m$^3$ | Remarks |
| --- | --- | --- |
| 5 | 247–232 | good cells, smooth foaming action |
| 10 | 226–216 | good foam, much exotherm |

TABLE I-continued

| Water gms | Density kg/m³ | Remarks |
| --- | --- | --- |
| 20 | 205-195 | wet |
| 30 | 215-208 | wet |
| 40 | 215-208 | wet |

When the water was raised to 30 g of water per 296 g of polydiorganosiloxane or per 61.1 g of polymethylhydrogensiloxane, the foam which was produced was wet to the touch. As the amount of water was increased, the resiliency of the foam decreased.

EXAMPLE 3

A foam sample was prepared using a different part A than in Example 1, a lower viscosity dimethylvinylsiloxy endblocked polydiorganosiloxane being used.

Part A was prepared by mixing 7.128 kg of the hydroxyl endblocked polydimethylsiloxane of Example 1, 6.4 kg of a dimethylvinylsiloxy endblocked polydimethylsiloxane having a viscosity of about 0.4 Pa·s at 25° C., and 82 g of the platinum catalyst of Example 1. This is the same ratio of ingredients as in Example 1.

Part B was prepared by mixing 96.9 g of the hydroxyl endblocked polydimethylsiloxane of Example 1, 54.1 g of the polymethylhydrogensiloxane of Example 1, 20 g of water, and 0.4 g of the cyclic methylvinylsiloxane.

A foam was produced by mixing 200 g of part A with the above part B in a container. The mixture formed a foam having good cell structure, but upon curing, the foam split and had vapor pockets in the interior.

When the foam composition was again prepared as above, but poured out onto a paper, an excellent sheet of foam was produced.

When the foam composition was again prepared as above, but the amount of polymethylhydrogen in part B was increased to 64.1 g, the resulting foam did not split in the cup upon curing.

EXAMPLE 4

A series of foamable compositions were prepared using different viscosity methylvinylsiloxy endblocked polydimethylsiloxane to vary the amount of vinyl radical present, thus varying the ratio of vinyl radical to hydrogen on silicone ratio.

A first composition was prepared by making a part A by mixing 49.4 parts of the hydroxyl endblocked polydimethylsiloxane of Example 1, 44.3 parts of the dimethylvinylsiloxy endblocked polydimethylsiloxane of Example 1, 0.5 part of the platinum catalyst of Example 1, and 5.7 parts of a pigment mixture containing 80 percent by weight of a dimethylvinylsiloxy endblocked polydimethylsiloxane having a viscosity of about 0.4 Pa·s at 25° C. and 20 percent by weight of a mixture of 1 part lamp black and 2 parts zinc oxide.

A first part B was prepared by mixing 59.9 parts of the hydroxyl endblocked polydimethylsiloxane of Example 1, 37.8 parts of the polymethylhydrogensiloxane of Example 1, 2 parts of water, and 0.4 part of the cyclic methylvinylsiloxane of Example 1.

A foam was prepared by rapidly mixing part A and part B in a container and allowing a foam to form. A fairly exothermic reaction took place, resulting in an even foaming action with a slight pause near the end. The foam had a uniform structure with a density of about 255 kg/m³.

A second composition was prepared in which the dimethylvinylsiloxy endblocked polymer having a viscosity of about 30 Pa·s at 25° C. was replaced with one having a viscosity of about 0.4 Pa·s at 25° C. (as in Example 3) in part A. The remainder of part A and all of part B was identical to the first composition above.

A second foam was prepared by mixing part A and part B in a container and allowing a foam to form. The foam formed rapidly and tore itself apart during the expansion process producing massive internal splits. Apparently, the polymer crosslinked so rapidly that the gas being generated could not be accommodated by the stretching or flowing of the polymer; and the gas ruptured the crosslinked polymer.

A third composition was prepared in which the dimethylvinylsiloxy endblocked polymer used was one having a viscosity of about 10 Pa·s at 25° C. The remainder of part A and all of part B was identical to the first composition above.

A third foam was prepared by mixing part A and part B in a container and allowing a foam to form. The exothermic reaction proceeded uniformly to give good cell structure. The foam had a density of about 263 kg/m³.

A fourth composition was prepared in which the dimethylvinylsiloxy endblocked polymer used was one having a viscosity of about 2.1 Pa·s at 25° C. The remainder of part A and all of part B was identical to the first composition above.

A fourth foam was prepared by mixing part A and part B in a container and allowing a foam to form. The foam was formed satisfactorily, but it was more brittle than that from the first and third compositions. The foam had a density of about 312 kg/m³.

A fifth composition prepared in which the hydroxyl endblocked polymer was used in part A to replace the dimethylvinylsiloxy endblocked polymer used in the other compositions. The remainder of part A and all of part B was identical to the first composition above.

A fifth foam was prepared by mixing part A and part B in a container and allowing a foam to form. The reaction was exothermic, forming a satisfactory foam, but the cell structure was not as uniform as those compositions containing the dimethylvinyl endblocked polymer. The foam had a density of about 295 kg/m³.

In all five cases, there was an excess of polymethylhydrogen over that required to react with the hydroxyl radicals and vinyl radicals to cause crosslinking and with the hydroxyl radicals and water to cause hydrogen gas generation. The second foam had the highest crosslinking capability and was the sample that ruptured and split during the foam process.

EXAMPLE 5

A series of foamable compositions were prepared using different viscosity hydroxyl endblocked polydimethylsiloxane to vary the amount of crosslinking due to varying amounts of hydroxyl radical on silicon in the formulations.

A first composition was prepared by mixing a part A of 49.4 parts of a hydroxyl endblocked polydimethylsiloxane having a viscosity of about 2 Pa·s at 25° C., a molecular weight of about 26,000 and about 0.131 wt % hydroxyl, 44.3 parts of the dimethylvinylsiloxy endblocked polydimethylsiloxane of Example 1, 0.6 part of the platinum catalyst of Example 1, and 5.7 parts of the pigment mixture of Example 4.

A first part B was prepared by mixing 59.9 parts of the hydroxyl endblocked polydimethylsiloxane used in part A, 37.8 parts of the polymethylhydrogensiloxane of Example 1, 2 parts of water, and 0.4 part of cyclic methylvinylsiloxane.

A foam was prepared by mixing part A and part B in a container and allowing a foam to form. The foam was not as good as those of Example 4.

A second part A was prepared identical to the above first part A, but a hydroxyl endblocked polydimethylsiloxane having a viscosity of about 12 Pa·s, a molecular weight of about 41,000 and a hydroxyl radical content of about 0.0747 wt %, was used in place of the polymer of 2 Pa·s viscosity.

A second part B was prepared identical to the above first part B, but the 12 Pa·s viscosity polymer was used in place of 2 Pa·s polymer.

A second foam was prepared as above. The foam formation was exothermic, but slower to form than in the first composition. The composition had a snap time of about 3 minutes. The foam had a density of about 235 kg/m³.

A third part A was prepared identical to the above first part A, but a hydroxyl endblocked polydimethylsiloxane having a viscosity of about 48 Pa·s at 25° C., a molecular weight of about 60,000, and a hydroxyl radical content of about 0.057 wt % was used in place of the 2 Pa·s viscosity polymer.

A third foam was prepared as above. This composition gave the best foam of this series, having a very uniform cell structure. The foam had a density of about 272 kg/m³. The composition had a snap time of about 2 minutes.

EXAMPLE 6

A series of foamable compositions was prepared using hydroxyl endblocked polydimethylsiloxane or dimethylvinylsiloxy endblocked polydimethylsiloxane or mixtures in the amounts shown in Table II. In each case, part A was prepared by mixing 93.7 parts of polydiorganosiloxane and 0.6 part of the platinum catalyst of Example 1. Part B was prepared by mixing 59.9 parts of polydiorganosiloxane, 37.8 parts of the polymethylhydrogensiloxane of Example 1, 2 parts of water, and 0.4 part of cyclic methylvinylsiloxane. The hydroxyl polymer is that described in Example 1, as is the vinylpolymer.

Foams were prepared by mixing part A and part B together in each case in a container and allowing the foam to form. Samples of the foam were then measured for properties as shown in Table II. The resiliency is measured in accordance with ASTM D 2632. Compressibility is the load required to compress the sample 25 percent of its thickness, measured according to ASTM D575A.

The foam containing 49.4 parts of hydroxyl endblocked polydimethylsiloxane and 44.3 parts of dimethylvinylsiloxy endblocked polydimethylsiloxane in part A (Composition 3) has a significantly higher resiliency and compressibility than either of the other compositions.

TABLE II

|  | 1 | 2 | 3 |
|---|---|---|---|
| Composition |  |  |  |
| Part A |  |  |  |
| hydroxyl polymer | 93.7 |  | 49.4 |
| vinyl polymer |  | 93.7 | 44.3 |
| Part B |  |  |  |
| hydroxyl polymer | 59.9 |  | 59.9 |
| vinyl polymer |  | 59.9 |  |
| Properties |  |  |  |
| Density, kg/m³ | 237 | 210 | 250 |
| Resiliency, Bashore | 38 | 39 | 49 |
| Compressibility, kPa | 6.9 | 6.9 | 10.3 |
| Cell Size |  |  |  |
| range, mm | 0.3-1 | 0.2-1 | 0.2-1.5 |
| average, mm | 0.7 | 0.5 | 0.5 |
| number of cells per 10 mm | 24 | >30 | >30 |

EXAMPLE 7

Compositions similar to that of Example 5, third composition but containing additives to produce lower density were prepared.

Sample 1 was a control having the formulation of Example 4, sample 3.

Sample 2 was prepared by mixing 20 g of the part A of the above sample 1 with 20 g of the part B to which had been added 4 g of a surfactant or profoamer.

The profoamer was prepared by reacting 3,584 g of a solid, benzene soluble resin copolymer consisting essentially of trimethylsiloxy units and $SiO_{4/2}$ units with a ratio of about 0.77 trimethylsiloxy unit to each $SiO_{4/2}$ unit and a hydroxyl content of about 2.8 percent by weight as a 75 percent by weight solution in xylene, 3,595 g of $F(CH_2)_nCH_2CH_2Si(CH_3)Cl_2$, where n varied from 6 to 8 with a calculated molecular weight of 442, and 1920 g of toluene, using 1.28 g of trifluoromethane sulfonic acid as the catalyst. The resin copolymer solution and the fluorinated silane were placed in a round bottomed flask fitted with stirrer, condenser, and nitrogen purge. First ½ of the toluene was added and stirring began. The rest of the toluene was added, then the catalyst. The flask was heated and when the contents reached 60° C., the temperature was stabilized. The reaction was continued at 60° C. for 1 hour, then the mixture was neutralized by slowly adding 120 g of sodium bicarbonate. When the mixture was neutral, 3024 g of a trimethylsiloxy endblocked polydimethylsiloxane fluid having a viscosity of about 0.02 Pa·s at 25° C. was added. The mixture was cooled to room temperature and filtered to remove the sodium salt. The filtrate was then stripped, starting at 80° C. under vacuum, to remove the volatile materials present. Stripping continued until the temperature reached about 110° C. and the pressure was about 130 Pa. The product had a viscosity of about 4.8 Pa·s at 25° C. and a weight average molecular weight of about 8500.

The F(CF$_2$)$_n$CH$_2$CH$_2$Si(CH$_3$)Cl$_2$ was prepared by first distilling a sample of F(CF$_2$)$_n$CH=CH$_2$ received from E. I. DuPont deNemours and Co. under reduced pressure to yield a mixture of homologs where n had a value of 6, 8, 10, or 12. The average molecular weight of the distillate was 422 g/mol. The distilled olefin was then combined with 8 percent by weight of zinc dust and heated at about 80° C. for one hour, at which time the liquid portion was distilled under reduced pressure. The fraction boiling from 54° C. at 8.4 kPa to 120° C. at 4.7 kPa was collected and analyzed by vaporphase chromatography. The fraction was found to contain 34 percent by weight of F(CF$_2$)$_6$CH=CH$_2$, 37 percent by weight F(CF$_2$)$_8$CH=CH$_2$, 22 percent by weight F(CF$_2$)$_{10}$CH=CH$_2$, and 4 percent by weight of F(CF$_2$)$_{12}$CH=CH$_2$. The calculated average molecular weight was 442.

Three 64.5 g portions of this fraction were each reacted in sealed tubes with 23 g of methyl dichlorosilane in the presence of 200 microliters of a chloroplatinic acid in isopropanol solution. The sealed tubes were heated for 5 hours at 115° C. The resultant products were combined and distilled under reduced pressure. The fraction boiling from 71° C. at a pressure of 2.9 kPa to 150° C. at a pressure of 0.133 kPa was collected and analyzed. The fraction amounted to 86 percent yield, based upon reactants, and exhibited an average molecular weight of 544 g/mol. The fraction was found to contain 38% of the F(CH$_2$)$_n$CH$_2$CH$_2$Si(CH$_3$)Cl$_2$ homolog where n=6, 35 percent of the n=8 homolog, 19% of the n=10 homolog, and 4 percent of the n=12 homolog.

Sample 3 was prepared by mixing 20 g of the part A of the above sample 1 with 20 g of the part B to which had been added 4 g of the profoamer described above in sample 2 and 0.4 g of lauryl alcohol.

In each case, a foam was prepared by mixing part A and part B together in a container and allowing a foam to form. The control had a density of 384 kg/m$^3$, the 2nd sample was 304 kg/m$^3$, while the 3rd sample was 271 kg/m$^3$. The sample with profoamer and lauryl alcohol had a softer, finer cell structure than the control.

EXAMPLE 8

A series of foams were prepared using a profoamer and/or an alcohol to modify the foam structure.

Part A was prepared by mixing 1572 g of the hydroxyl endblocked polymer of Example 5, third composition, 1410 g of the dimethylvinylsiloxy endblocked polymer of Example 1, and 18 g of the platinum catalyst of Example 1.

Part B was prepared by mixing 101 g of the hydroxyl endblocked polymer, 63.6 g of the polymethylhydrogensiloxane of Example 1, 3.24 g of water, and 0.56 g of methylvinyl cyclics.

Foams were prepared by mixing the amount shown in Table III of profoamer of Example 7 and/or lauryl alcohol into the amount of part B shown, then mixing in the amount of part A and allowing a foam to form in the container. The density and resiliency of each foam is shown in the table.

Adding the profoamer caused an increase in density and a decrease in resiliency. Adding lauryl alcohol caused a decrease in density and resiliency. Adding both profoamer and alcohol caused a reduction in density and resiliency.

TABLE III

|  | 1 | 2 | 3 | 4 | 5 |
|---|---|---|---|---|---|
| Composition |  |  |  |  |  |
| part A | 50 | 27.5 | 27 | 24.5 | 27.5 |
| part B | 50 | 24.0 | 24 | 24 | 24 |
| profoamer | — | 3.08 | 3 | — | 3.06 |
| lauryl alcohol | — | 0.5 | — | 0.5 | — |
| octyl alcohol | — | — | — | — | 0.5 |
| Properties |  |  |  |  |  |
| Density, kg/m$^3$ | 240 | 208 | 272 | 224 | 176 |
| Resiliency, Bashore | 51 | 29 | 42 | 35 | 34 |
| Compressibility, kPa | 21 |  | 5.5 |  |  |
| Cell Size Range, mm | 0.1–0.8 |  | 0.1–0.8 |  |  |
| Average Cell Size, mm | 0.3 |  | 0.1 |  |  |
| Number of Cells per 10 mm | 26 |  | >40 |  |  |

EXAMPLE 9

A composition was prepared which made use of a profoamer and an alcohol in the composition.

A part A was prepared by mixing 52.5 g of hydroxyl endblocked polydimethylsiloxane fluid of Example 5 third part A, 47 g of the dimethylvinylsiloxy endblocked polymer of Example 1, and 0.6 g of the platinum catalyst of Example 1. A 12 g portion of this part A was then mixed with 0.36 g of normal propanol, 1.8 g of profoamer described below and 3 g of a mixture of 75 percent by weight of the dimethylvinylsiloxy endblocked polydimethylsiloxane of Example 1 and 25 percent by weight of a 60 percent by weight solution of a benzene soluble resin copolymer of triorganosiloxy units and SiO$_2$ units in the mole ratio of about 0.7 mole of triorganosiloxy unit per mol of SiO$_2$ units where the triorganosiloxy units were trimethylsiloxy units and dimethylvinylsiloxy units so that the resin copolymer had about 1.8 weight percent vinyl radicals.

The profoamer was made by first mixing in a glass flask 5 parts of a mixture of homologous fluoroalcohols of the general formula F(CF$_2$)$_n$CH$_2$CH$_2$OH where the average value of n is 8 (commercially available as Zonyl½ BA fluoroalcohol from E. I. DuPont deNemours Co.) and 33 parts of xylene. This mixture was heated to reflux temperature, then a mixture of 62 parts of a 72 percent by weight solids in xylene mixture of a resinous, benzene-soluble organosiloxane copolymer of the type described by Daubt and Tyler in U.S. Pat. No. 2,676,182 and containing (CH$_3$)$_3$SiO$_{\frac{1}{2}}$ units and SiO$_2$ units in a molar ratio of about 0.7:1 and about 3 percent by weight hydroxyl radicals and 0.25 part of 1 normal potassium hydroxide was slowly added through an addition funnel. This mixture was refluxed for about 1 hour with a Dean-Stark water trap in the setup to remove the water formed by the condensation of the resin hydroxyl groups and the fluoroalcohol. The flask was then cooled and 1 part of an acid treated clay was admixed to neutralize the potassium hydroxide. Then 50 parts of trimethylsiloxy endblocked polydimethylsiloxane fluid having a viscosity of 0.01 Pa.s at 25° C. was admixed and the contents heated to strip off the xylene. The remaining fluid was then cooled and filtered to remove the clay and potassium salts. The filtrate was a 50 percent solution of profoamer in silicone fluid.

A part B was prepared by mixing 52.5 g of the hydroxyl endblocked polydimethylsiloxane fluid of Example 5 third part A, 33 g of the polymethylhydrogensiloxane of Example 1, 1.71 g of water, and 0.3 g of cyclic methylvinylsiloxane.

A foam was prepared by mixing the above part A with 18 g of part B and allowing a foam to form. The foam had a density of about 70 kg/m³, a compressibility at 25 percent compression of 6.9 kPa and at 65 percent compression of 24 kPa·s, and a Bashore resiliency of 27.

A repeat composition of the above composition was prepared in the same manner as described and the foam produced was tested with the following results. A comparative example was prepared in an identical manner, but the water was removed from the composition. The properties of the two foams produced were:

|  | With Water | Comparative Example |
| --- | --- | --- |
| Density, kg/m³ | 80 | 129 |
| Resiliency, Bashore | 26 | 36 |
| Compressibility, kPa |  |  |
| at 25% compression | 0.9 | 4.3 |
| at 65% compression | 2.6 | 18.0 |

EXAMPLE 10

An example was prepared to illustrate the effect of the claimed profoamer in comparison to a fluorinated siloxane.

A part A was prepared by mixing 52.4 parts of hydroxyl endblocked polydimethylsiloxane having a viscosity of about 48 Pa·s at 25° C., 47 parts of dimethylvinylsiloxy endblocked polydimethylsiloxane having a viscosity of about 30 Pa·s at 25° C., and 0.6 part of the platinum catalyst of Example 1.

A part B was prepared by mixing 52.4 parts of the hydroxyl endblocked polydimethylsiloxane, 33 parts of trimethylsiloxy endblocked polymethylhydrogensiloxane with a viscosity of about 0.03 Pa·s at 25° C. and a hydrogen atom content of about 1.6 weight percent, 1.71 parts of water, and 0.3 part of cyclic methylvinylsiloxane.

A control foam was prepared by mixing 50 g part A and 50 g of part B together for from 30 to 60 seconds until uniformly mixed and then allowing the mixture to froth and cure to a foam at room temperature. Samples were removed from the foam and measured for physical properties. The compressibility is the unit load required to compress a sample 25 percent of its thickness on a sample 50 mm×50 mm ×25 mm. The resiliency was measured according to ASTM D 2632 on a 37.5 mm by 7.5 mm by 2.5 to 5 mm sample placed in a Bashore resiliometer so that the upper surface when tested was the lower surface which was against the container when the foam was formed. The results are shown in Table V.

A foam falling under the claims of this invention was prepared by first mixing 50 g of part A with 6 g of the profoamer of Example 7 to give an improved part A. Foam was prepared by mixing 56 g of the improved part A with 50 g of part B and allowing to foam as in the control foam above. The foam was tested as above with the results shown in Table V.

A comparative foam was prepared by mixing 50 g of the above part A with 6 g of trimethylsiloxy endblocked polytrifluoropropyl(methyl)siloxane fluid having a viscosity of 0.3 Pa·s at 25° C. This 56 g of comparative part A was then mixed with 50 g of the part B above and allowed to foam as in the control foam above. The foam was tested as above with the results shown in Table V.

A second comparative foam was prepared by mixing 50 g of part A above with 6 g of trimethylsiloxy endblocked polytrifluoropropyl(methyl)siloxane fluid having a viscosity of 1.0 Pa·s at 25° C. This second comparative part A was then mixed with 50 g of part B above and allowed to form a foam as in the control foam above. The foam was tested as above with the results shown in Table V.

The profoamer containing foam had a lower density, compressibility (softer), and Bashore resiliency than the control and comparative fluorinated siloxane mixtures. The profoamer containing foam had smaller cells on average, but did contain a few very large cells, probably because of poor mixing since these samples were hand mixed.

TABLE V

|  | Control | Profoamer | Fluorinated Fluid 0.3 Pa · s | Fluorinated Fluid 1.0 Pa · s |
| --- | --- | --- | --- | --- |
| Density, kg/m³ | 242 | 213 | 268 | 244 |
| Compressibility, kPa | 17 | 10 | 21 | 16 |
| Resiliency, Bashore | 43 | 21 | 46 | 41 |
| Cell Size Range, mm | 0.5–4.0 | 0.1–8.0 | 0.5–3.5 | 0.3–1.5 |
| Average Cell Size, mm | 0.5 | 0.5 | 0.5 | 0.5 |
| Number of Cells per 10 mm | 28 | >40 | 24 | 23 |

That which is claimed is:

1. A method of producing an open-cell silicone foam at room temperature consisting of
(A) mixing ingredients consisting essentially of
   (1) 100 parts by weight of a polydiorganosiloxane having organic groups selected from the group consisting of methyl, ethyl, propyl, vinyl, phenyl, and 3,3,3-trifluoropropyl, endblocking consisting of hydroxyl or vinyl groups, and a viscosity of from 0.4 to 100 Pa·s at 25° C.,
   (2) from 15 to 50 parts by weight of a silicon hydride of the formula

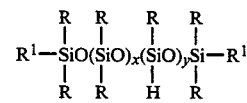

where R is an alkyl radical of 1 to 4 carbon atoms or phenyl and $R^1$ is R or hydrogen, x and y are such that x is from 0 to 40 percent of y, y is at least 3, and x plus y are such that the viscosity of the silicon hydride is below 0.05 Pa·s at 25° C., (3) from 0.5 to 15 parts by weight of water, (4) from 10 to 100 parts by weight of platinum per million parts of (A) in the form of a platinum catalyst, (5) optionally a profoamer consisting essentially of a resinous, benzene-soluble organosiloxane copolymer consisting essentially of $SiO_{4/2}$ units, silicon-bonded hydroxyl groups, $(CH_3)_3SiO_{\frac{1}{2}}$ units and fluorine-containing units selected from the group consisting of $R_aR_b'SiO_{(4-a-b)/2}$ and $R''[Si(R')_bO_{(3-b)/2}]_2$ and mixtures thereof, where R is a monovalent organic radical containing at least four perfluorinated carbon atoms and is bonded to the silicon atom of said fluorine-containing units by a sequence of at least two methylene units or by an oxygen atom that is, in turn, bonded to a sequence of at least two methylene units, R' is an alkyl radical containing from 1 to 3 carbon atoms, and R'' is a divalent organic radical containing at least four perfluorinated carbon atoms and is bonded to the silicon atom of said fluorinecontaining units by means of a carbon or oxygen atom, a is 1 or 2, b is 0, 1 or 2 and the sum of a and b is 3 or less with the provision that when R and R'' represent fluorine-containing units bonded to silicon via an oxygen atom the organosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and $SiO_{4/2}$ units to $SiO_{4/2}$ units is from 0.7:1 to 1.1:1, inclusive, and the concentration of said fluorinecontaining units and any $GSiO_{3/2}$ units is sufficient to (a) impart a surface tension of less than $2.2 \times 10^{-4}$ newtons per centimeter at 25° C. to a 10 percent by weight solution of (5) in a hydroxyl end-blocked polydimethylsiloxane exhibiting a viscosity of 0.08 Pa.s at 25° C., and (b) require the addition of from 0 to 100 percent by weight of xylene to said 10 percent by weight solution to achieve optical clarity, and (6) optionally an alcohol having from 1 to 12 carbon atoms, and (B) allowing the mixture to form a froth and cure at ambient temperature to an elastomeric silicone foam.

2. The method of claim 1 in which (1) comprises a polydiorganosiloxane having hydroxyl endblocking groups and a polydiorganosiloxane having vinyl endblocking groups.

3. The method of claim 1 in which (2) is present in an amount of from 15 to 30 parts by weight.

4. The method of claim 3 in which the silicon hydride is such that x is less than 5 percent of y.

5. The method of claim 1 in which (3) is present in an amount of from 1 to 5 parts by weight.

6. The method of claim 2 in which (2) is present in an amount of from 15 to 30 parts by weight.

7. The method of claim 2 in which (3) is present in an amount of from 1 to 5 parts by weight.

8. The method of claim 1 in which the profoamer (5) is present in an amount of from 1 to 10 parts by weight.

9. The method of claim 1 in which the fluorine-containing units of (5) are of the formula $R_aR_b'SiO_{(4-a-b)/2}$ where R is $F(C_nF_{2n})(CH_2)_2O_c$; R' is methyl; a is 1; b is 0, 1, or 2; c is 0 or 1 and wherein each of said fluorine-containing units n represents an integer that is the same or different with respect to the value of n in other fluorine-containing units of (5), the average value of n being from 4 to 20 inclusive.

10. The method of claim 1 in which the alcohol (6) is present in an amount of from 1 to 5 parts by weight.

11. The method of claim 10 in which the alcohol is lauryl alcohol.

12. The method of claim 10 in which the alcohol is normal-propanol.

13. The method of claim 1 in which the ingredients are first mixed in two parts for storage purposes: ingredient (4) being in one part with all or part of (1) and ingredient (2) being in the other part.

* * * * *